United States Patent [19]
Howard

[11] Patent Number: 5,241,317
[45] Date of Patent: Aug. 31, 1993

[54] METHOD AND APPARATUS FOR DETERMINING TARGET ELEVATION ANGLE, ALTITUDE AND RANGE AND THE LIKE IN A MONOPULSE RADAR SYSTEM WITH REDUCED MULTIPATH ERRORS

[75] Inventor: Dean D. Howard, La Plata, Md.

[73] Assignee: The United States of America as represented by the Secretary of the Navy, Washington, D.C.

[21] Appl. No.: 889,806

[22] Filed: May 29, 1992

[51] Int. Cl.[5] ............................................. G01S 13/44
[52] U.S. Cl. ................................................... 342/149
[58] Field of Search ............... 342/149, 146, 140, 139, 342/133, 131, 80

[56] References Cited

U.S. PATENT DOCUMENTS

| | | |
|---|---|---|
| 3,229,283 | 1/1966 | Mefter et al. |
| 3,378,849 | 4/1968 | Letellier |
| 3,480,960 | 11/1969 | Zulch et al. |
| 3,579,239 | 7/1965 | Purcell, Jr. et al. |
| 3,740,750 | 6/1973 | Moulton |
| 3,890,617 | 6/1975 | Moulton |
| 3,969,726 | 7/1976 | Birleson |
| 4,005,421 | 1/1977 | Dax ..................................... 342/149 |
| 4,568,940 | 2/1986 | Diamond |

OTHER PUBLICATIONS

A. B. Mays et al., "Microcomputer Aided Tradking (MCAT)," NRL Report 8709 (Jul. 12, 1983).

Primary Examiner—Daniel T. Pihulic
Attorney, Agent, or Firm—Thomas E. McDonnell; Edward F. Miles

[57] ABSTRACT

The present invention relates to a method and system for determining target elevation angle, altitude and range and the like in a monopulse radar system with reduced multipath errors. A transmitter/receiver unit receives monopulse sum and difference signals caused by echoes from targets. The sum and difference signals are then logarithmically-amplified in a logarithmic amplifier unit. A selector selects one of the sum and difference signals having the largest amplitude, and generates a selection signal indicating which of the sum and difference signals has the largest amplitude. The selection signal is provided to a search radar target tracking unit which determines whether a target at a given range interval and azimuth interval, for example, has been selected for tracking by an operator. The search radar target tracking unit then controls a gate unit to selectively provide either the logarithmically-amplified sum signal or the logarithmically-amplified difference signal to a peak detection unit based on the selection signal, and based on whether a particular target has been selected for tracking. The peak detection unit determines peak value(s) in the logarithmically-amplified sum and difference signals provided by the gate unit. A target elevation angle/altitude calculation unit uses the peak value(s) to determine target elevation angle or altitude values, or average target elevation angle or altitude values. Such values may be displayed on a CRT for in correspondence with the selected target(s).

23 Claims, 9 Drawing Sheets

METHOD AND APPARATUS FOR DETERMINING TARGET ELEVATION ANGLE, ALTITUDE AND RANGE AND THE LIKE IN A MONOPULSE RADAR SYSTEM WITH REDUCED MULTIPATH ERRORS

BACKGROUND OF THE INVENTION

1. Field of the Invention

The present invention generally relates to determining target elevation angle, altitude and range and the like in a monopulse radar system and, more particularly, to a method and apparatus for determining target elevation angle, altitude and range and the like in a monopulse radar system with reduced multipath errors relative to conventional apparatuses and methods.

2. Description of the Related Art

Figure 1:
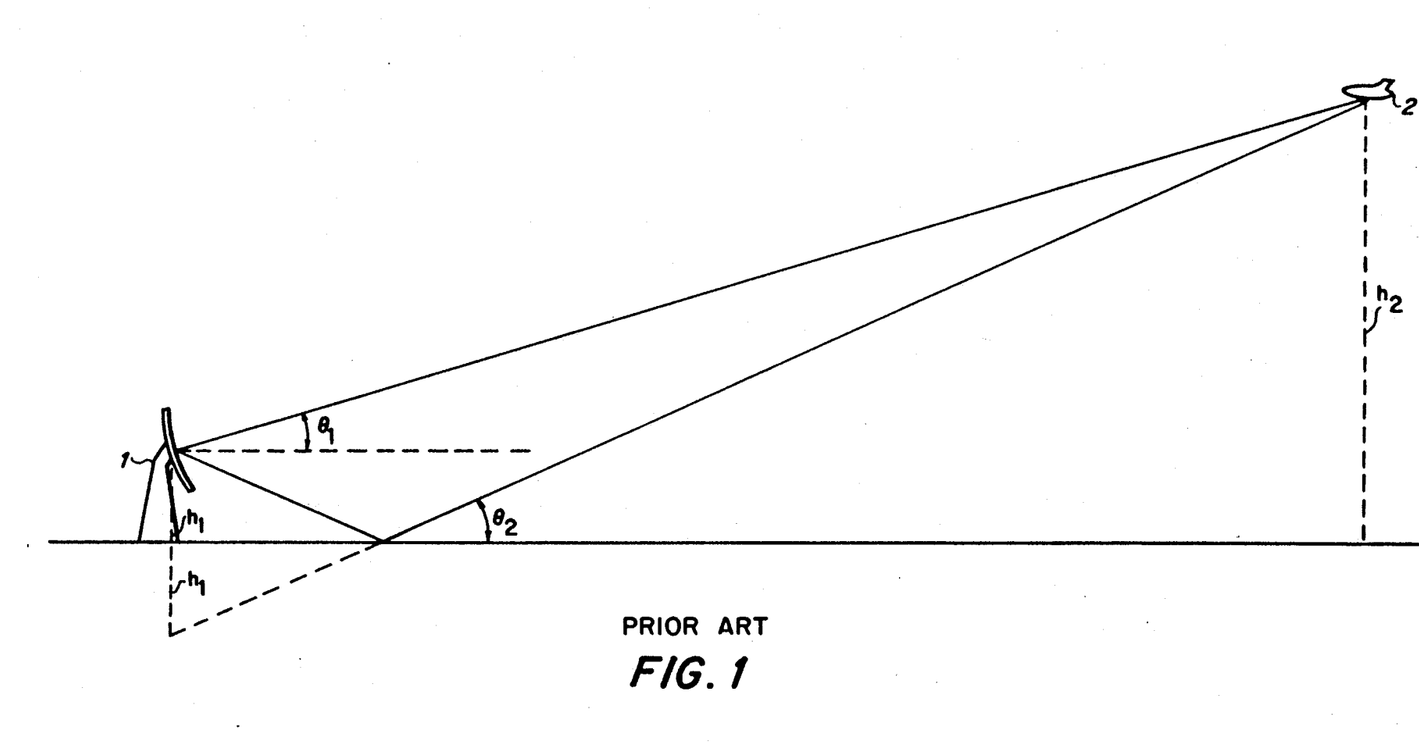
FIG. 1 is a diagram for explaining causes of multipath errors in radar systems.

FIG. 1 is a diagram for explaining causes of multipath errors in radar systems. A radar system 1 generates an antenna beam having an axis of symmetry about a line defined by an angle $\theta_1$ relative to some reference plane. In this case, the reference plane is parallel to the surface of the earth. Depending upon the beam-width of the antenna beam of the radar system 1, the antenna beam transmitted to the target 2 may be transmitted directly along the axis of symmetry at angle $\theta_1$ or may be transmitted to the target 2 by reflection at an angle $\theta_2$ relative to the surface of the earth. Also, a reflection or radar return signal termed an 'echo' may be received at the radar system 1 either directly along the axis of the symmetry of the antenna beam at angle $\theta_1$, or indirectly by reflection at an angle $\theta_2$ relative to the surface of the earth. The different transmission and/or reception paths cause multipath errors in target elevation angle, altitude and range measurements and the like. This is because, as target 2 moves relative to radar 1, direct echoes and multipath echoes go into and out of phase repeatedly. The problems caused by this is illustrated in FIG. 2.

Figure 2:
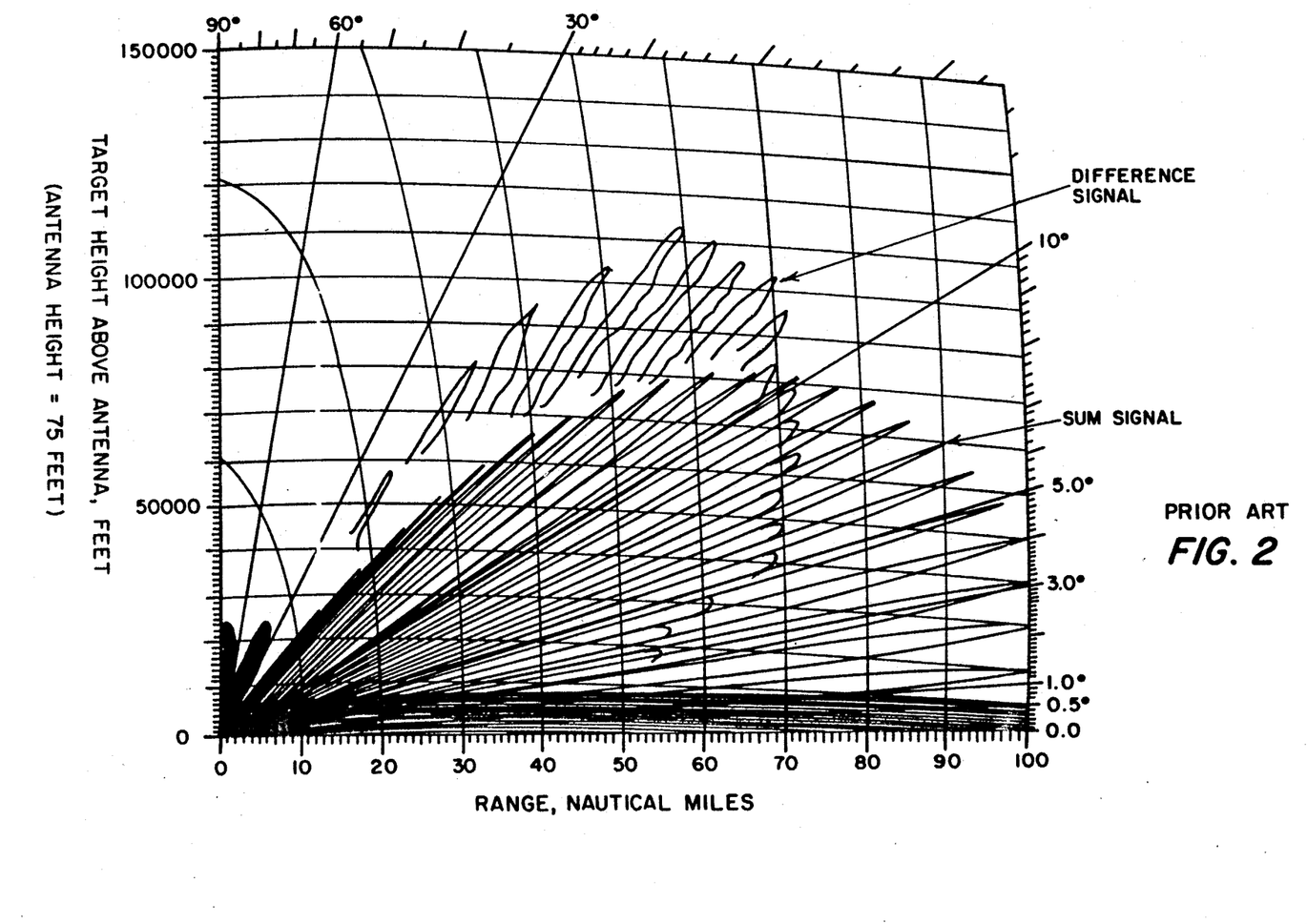
FIG. 2 is a graph of target elevation angle versus sum and difference signal amplitudes, for explaining multipath effects in a monopulse radar system.

FIG. 2 is a polar plot of target elevation angle versus sum and difference gain amplitudes for a monopulse radar which is receiving strong multipath echoes. In the absence of the multipath effects, the beam pattern received by a monopulse radar system would have amplitudes defined by envelopes formed by connecting the peaks of the sum and difference signals, respectively. The sum and difference signals are well-known phenomena occurring in monopulse radar systems.

Due to multipath effects, a phenomenon known as multipath lobing occurs, as illustrated in FIG. 2. With increasing elevation angle, for example, the amplitude of the sum signal progresses through peaks and nulls. Likewise, with increasing elevation angle, the difference signal also progresses through peaks and nulls. The peaks of the difference signal correspond to nulls of the sum signal while nulls of the difference signal correspond to peaks of the sum signal. These peaks and nulls correspond to points of maximum constructive and destructive interference, respectively, between direct and multipath echoes.

The multipath distortion of the amplitude and relative phase of the monopulse sum and difference signals cause the multipath error in monopulse elevation angle information. Therefore, the multipath effects of FIG. 2 must be compensated to obtain accurate target elevation angle, altitude and range measurements and the like. Some conventional methods count multipath lobes as a function of target range to solve for target elevation. However, such methods do not completely compensate for multipath effects and require long observation times to measure target elevation angle, altitude and range and the like. Further, some conventional methods use frequency agility to measure the frequency change required to cause a full multipath cycle. However, such methods require wide frequency bandwidths that are not available to low frequency search radars.

Figure 3:
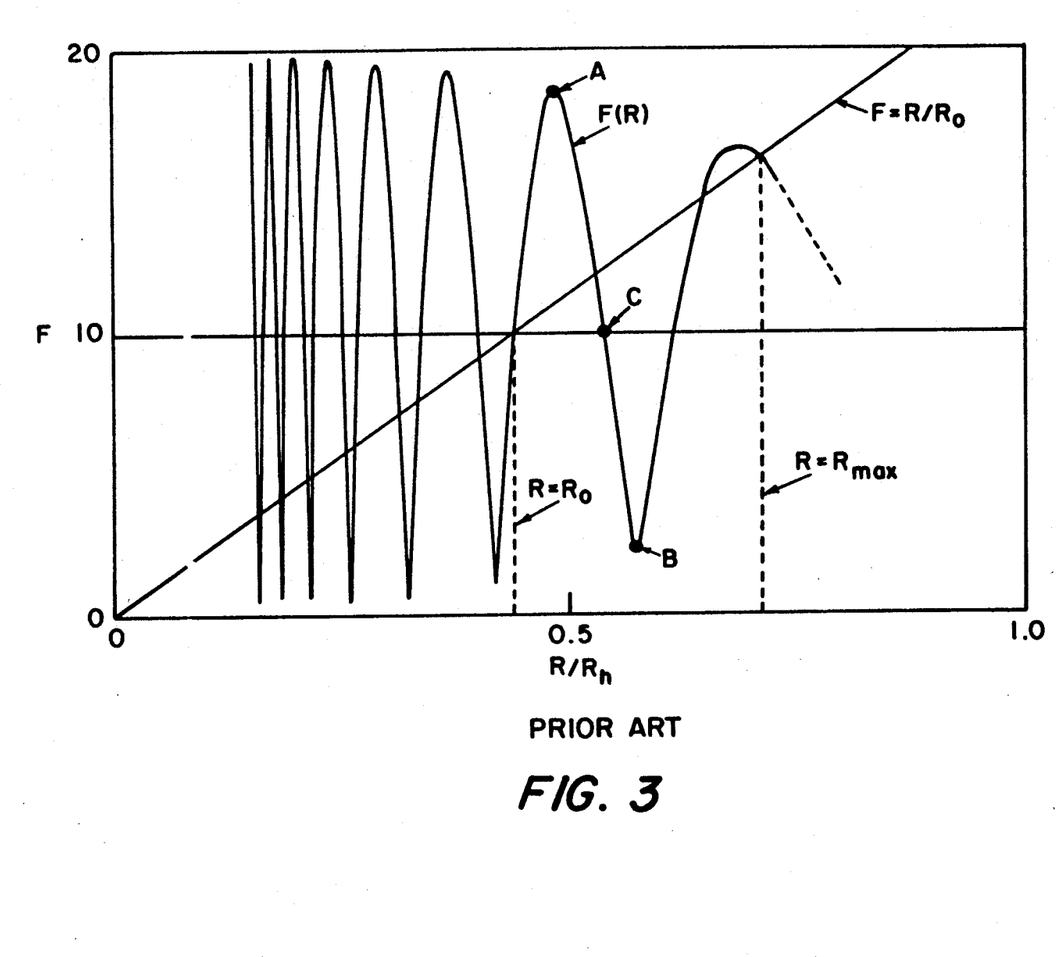
FIG. 3 is a graph of sum or difference signal versus range, for explaining fading cycles caused by multipath effects.

FIG. 3 is a diagram for explaining fading cycles caused by multipath effects. Referring to FIG. 3, if a target moves at a constant altitude and speed from left to right in FIG. 2, the amplitude of either the sum or difference signal received by a monopulse radar system has an amplitude determined by fading cycle function F(R), again, a result of periodic constructive and destructive interference between direct and multipath echoes. (One fading cycle is simply the time between consecutive peaks, in the cycle shown in FIG. 3.) The amplitude of the fading cycle function F(R) fluctuates rapidly toward the left of FIG. 3 due to the fact that the target 2 crosses through more multipath lobes in a given time interval or range interval when the target 2 is relatively near to the antenna feed of the monopulse radar system. On the other hand, the amplitude of the fading cycle function F(R) fluctuates less frequently at ranges relatively distant from the monopulse antenna feed since the target 2 is moving more parallel to the multipath lobes of the sum or difference signal.

Figure 4:
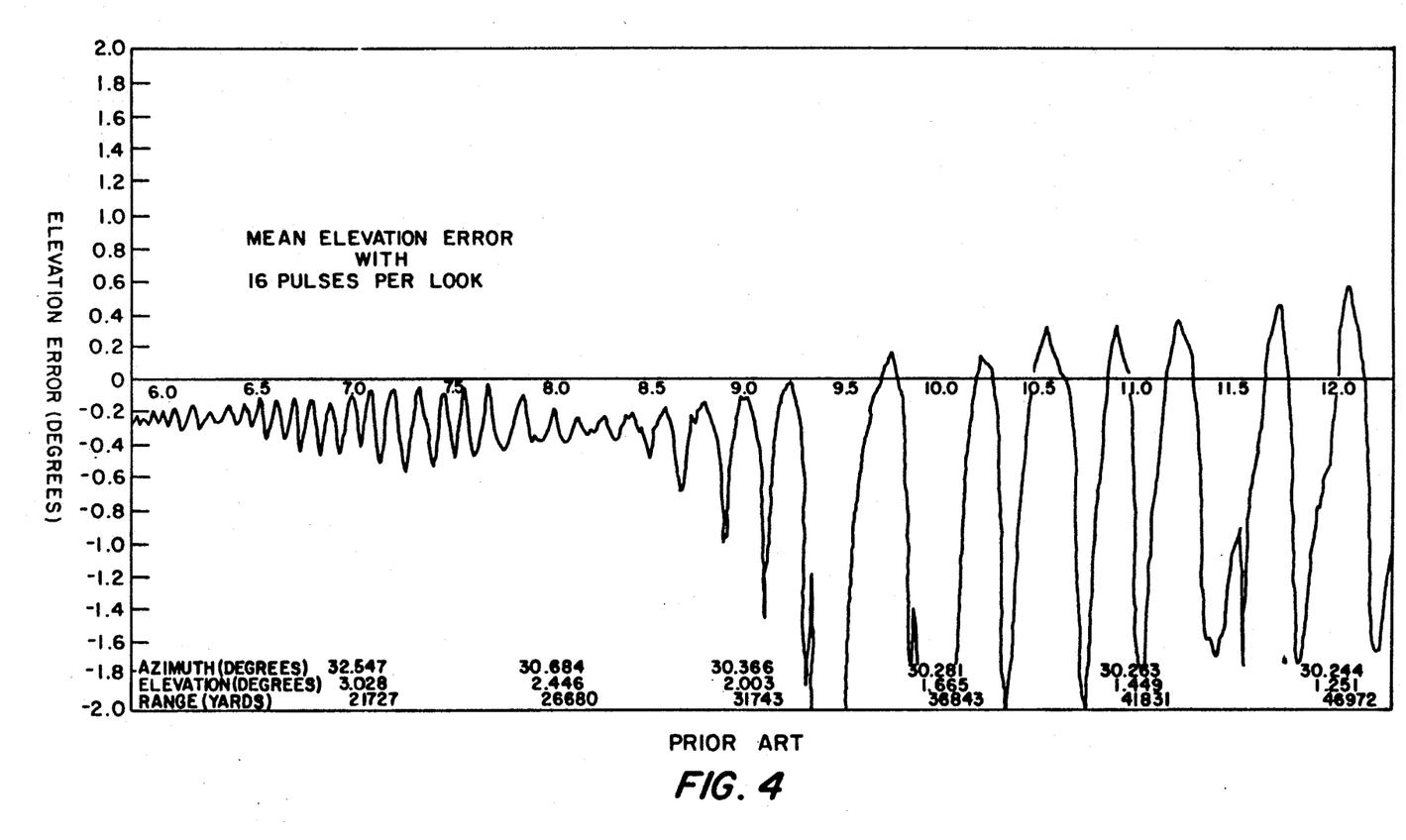
FIG. 4 is a graph of elevation angle error caused by multipath effects versus track time in a radar system.

FIG. 4 is a graph of elevation angle error caused by multipath effects versus track time in a radar system. The elevation angle error generally fluctuates less at higher elevation angles, and fluctuates more at relatively low elevation angles. This is because reflections from the surface of the earth are more acute at lower elevation angles than at higher elevation angles. The elevation error, particularly at low elevation angles, must be compensated or accounted for to obtain accurate target elevation angle, altitude and range measurements and the like.

SUMMARY OF THE INVENTION

An object of the present invention is to provide a method and system for reducing multipath errors in target elevation angle, altitude and range measurements and the like, relative to conventional apparatuses and methods.

This and other objects made apparent hereinafter, is obtained by the methods and systems herein disclosed. One such system comprises a transmitter/receiver unit for generating first and second antenna beams, and for receiving a sum signal and a difference signal caused by an echo from the first and second antenna beams. A peak detector unit is coupled to the transmitter/receiver unit. The peak detector unit determines a 8 first peak value based on the sum signal in a first fading cycle of the sum signal, and determines a second peak value based on the difference signal in a second fading cycle of the difference signal. Based on the first and second peak values, a target elevation angle/altitude calculation unit determines at least one of target elevation and altitude. Monopulse radars are conventionally calibrated to estimate elevation angle from the ratio of the absolute value of the difference signal (conventionally referred to as Δ) to the absolute value of the sum signal (conventionally called Σ). Multipath reflections so distort Δ and Σ over a fading cycle that such estimations are rendered difficult or impossible. By identifying peak amplitudes of Δ and Σ over at least one fading cycle, the radar has identified points which it can use reliably to calculate that ratio, and hence estimate target elevation. Further, the peak detector unit may generate a target range signal based on the first peak value and provide the target range signal to the display for display of target range.

This together with other objects and advantages, which will become subsequently apparent, reside in the details of construction and operation as more fully hereinafter described and claimed, reference being had to the accompanying drawings, forming a part hereof, wherein like numerals refer to like parts throughout.

DESCRIPTION OF THE PREFERRED EMBODIMENTS

The general principle of the present invention is to utilize peak values of the sum and/or difference signals generated by a monopulse radar system, to determine target elevation angle, altitude and range and the like. By using peak values of the sum and/or difference signals, multipath errors will be greatly reduced. In addition, by averaging target elevation angle, altitude and range and the like determined using such peak values, multipath errors will be further reduced.

The invention takes advantage of the typical search radar beam axis location on the horizon. Thus, all targets of interest are above the horizon and are known to be in a positive direction. Since the only need for relative phase between the sum signal and difference signal is to determine direction sense, the invention does not need the relative phase information since all targets are known to be at a positive angle. Therefore, the sum and difference signals can be separately averaged before processing to essentially eliminate multipath elevation errors.

The invention utilizes peak values of the sum and difference signal to generate target elevation angle or altitude measurements according to the relation:

$$\frac{\text{multipath peak } K\Delta}{\text{multipath peak } \Sigma} = \text{normalized target elevation angle,} \quad (1)$$

or $$\log(\text{multipath peak } K\Delta) - \log(\text{multipath peak } \Sigma) =$$

logarithm of normalized target elevation angle, where $K\Delta$ is the absolute value of the difference signal multiplied by constant K which depends on characteristics of the radar system, and $\Sigma$ is the absolute value of the sum signal. In the case of average target elevation angle or altitude measurements, the relation is:

$$\text{Avg} \frac{\text{multipath peaks } K\Delta}{\text{multipath peaks } \Sigma} = \text{average normalized elevation angle,} \quad (2)$$

or $$\text{Avg} [\log(\text{multipath peaks } K\Delta) - \log(\text{multipath peaks } \Sigma)] =$$

average of the logarithm of normalized target elevation angle, where Avg denotes an averaging operation. (Averaging over several cycles is preferred to make one's data more certain. However, one can practice the invention by using one $\Sigma$ and $\Delta$ peak each, over just one fading cycle.) The normalized elevation angle or average normalized elevation angle may be converted to target altitude or average target altitude values, respectively, using standard trigonometric relationships or a look-up table. Target range measurements are merely a function of the time difference between transmission of radar antenna beams and reception of an echo by the radar antenna beams, from the target. Accordingly, target range can be readily determined using the time difference between transmission of radar antenna beams and the reception of the sum or difference signal, or peak values of the sum or difference signal.

For simplicity, in the following description, absolute value signs for the sum signal, $\Sigma$, and the difference signal multiplied by a constant, $K\Delta$, will be omitted. However, it is here noted that amplitude values of the sum signal, $\Sigma$, and the difference signal, $K\Delta$, are absolute values.

Figure 5:
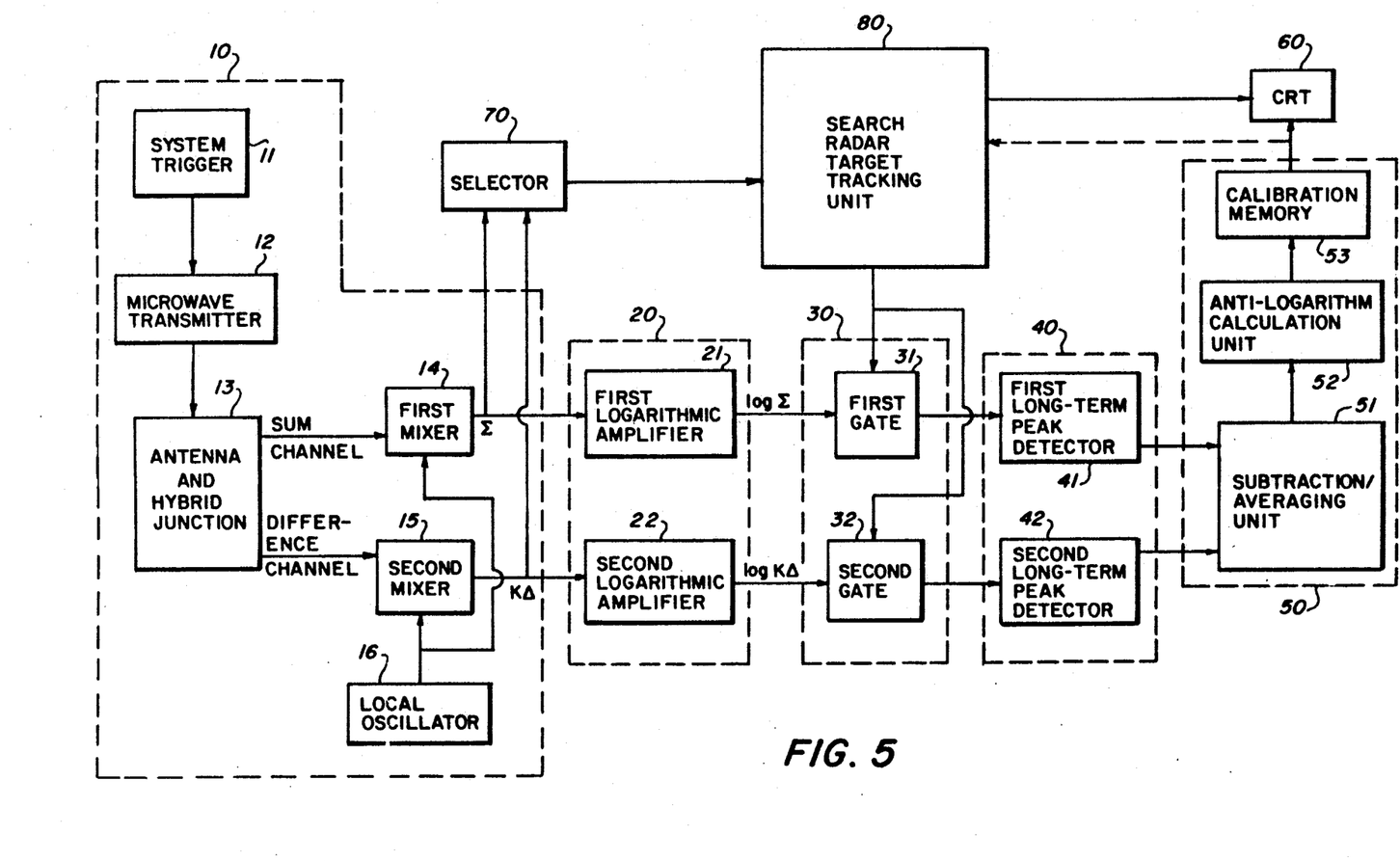
FIG. 5 is a block diagram of a system in accordance with a preferred embodiment of the present invention.

In the preferred embodiment of the present invention, referring to FIG. 5, a transmitter/receiver unit 10 includes a system trigger 11, a microwave transmitter 12, an antenna and hybrid junction 13, a first mixer 14, a second mixer 15 and a local oscillator 16. The transmitter/receiver unit 10 is well known and is more fully explained, for example, in U.S. Pat. No. 3,740,750 ("Moulton") for a MONOPULSE RECEIVER SYSTEM, issued Jun. 19, 1973 to J.A. Moulton, which is incorporated herein by reference.

The system trigger 11 controls the timing of transmission of the antenna beams in the monopulse radar system of FIG. 5. Based on a trigger signal generated by the system trigger 11, the microwave transmitter 12 generates a microwave signal and supplies such microwave signal to the antenna and hybrid junction 13.

The antenna and hybrid junction 13 generates first and second antenna beams based on the microwave signal and irradiates a radar coverage area. Echoes from a target within the radar coverage area are received as a signal corresponding to the sum signal and a signal corresponding to the difference signal, which are supplied to the first mixer 14 and the second mixer 15, respectively.

A local oscillator 16 generates a mixing signal of predetermined frequency, which is supplied to the first mixer 14 and the second mixer 15. The first mixer 14 generates beats by mixing the signal corresponding to the sum signal with the mixing signal. These beats represent the sum signal $\Sigma$. Similarly, the second mixer 15 mixes the signal corresponding to the difference signal with the mixing signal to generate beats which represent the difference signal multiplied by a constant, $K\Delta$.

A logarithmic amplifier unit 20 receives the sum signal $\Sigma$ and the difference signal multiplied by a constant, $K\Delta$, and logarithmically amplifies such signals to generate a logarithmically-amplified sum signal, log $\Sigma$, and a logarithmically-amplified difference signal, log $K\Delta$. In the preferred embodiment, the logarithmic amplifier unit 20 includes a first logarithmic amplifier 21 and a second logarithmic amplifier 22 such as the logarithmic amplifiers of Moulton. The first logarithmic amplifier 31 receives the sum signal $\Sigma$ from the transmitter/receiver unit 10 and logarithmically amplifies the sum signal $\Sigma$ to generate the logarithmically-amplified sum signal log $\Sigma$. Likewise, the second logarithmic amplifier 22 receives the difference signal multiplied by a constant, $K\Delta$, and generates a logarithmically-amplified difference signal log $K\Delta$.

The logarithmically-amplified sum signal log $\Sigma$ and the logarithmically-amplified difference signal log $K\Delta$ are supplied to a gate unit 30 which selectively allows the logarithmically-amplified sum signal log $\Sigma$ and the logarithmically-amplified difference signal log $K\Delta$ to pass through the gate unit 30 to a peak detection unit 40. In the preferred embodiment, the gate unit 30 includes first gate 31 and second gate 32. Gates such as first gate 31 and second gate 32 are well known. The first gate 31 selectively passes the logarithmically-amplified signal log $\Sigma$ to the peak detection unit 40, while the second gate 32 selectively passes the logarithmically-amplified difference signal log $K\Delta$ to a peak detection unit 40.

The logarithmically-amplified sum signal or the logarithmically-amplified difference signal are supplied to the peak detection unit 40 based on the gate signal. The peak detection unit 40 samples the logarithmically-amplified sum signal and the logarithmically-amplified difference signal when a target corresponding to such signals has been selected. The peak detection unit 40 stores resulting sampled values of such signals over a predetermined number of scans of the monopulse radar system and compares the stored samples to determine first and second peak values for the logarithmically-amplified sum signal and logarithmically-amplified difference signal, respectively.

In the preferred embodiment, the peak detection unit 40 includes first long-term peak detector 41 and second long-term peak detector 42. The first long-term peak detector 41 and second long-term peak detector 42 may be realized with a microprocessor coupled to a memory. The first long-term peak detector 41 samples the logarithmically-amplified sum signal provided by the gate unit 30 and stores resulting sampled values for a predetermined number of scans of the monopulse radar system. Then, the first long-term peak detector 41 sequentially compares successive sampled values of the logarithmically-amplified sum signal from the first sampled value to the last sampled value stored in the first long-term peak detector 41. When a given sampled value is less than the next sampled value, it is known that the sample values are increasing to a peak value. The first long-term peak detector 41 proceeds to compare successive values of the logarithmically-amplified sum signal until a given sampled value is greater than the next sampled value of the logarithmically-amplified sum signal. At that point, it is known that the given sampled value corresponds to a peak value of the logarithmically-amplified sum signal, and this value is stored in the first long-term peak detector 41. The above processing continues until the next-to-last sampled value and the last sampled value have been compared. At this time, all peak values of the logarithmically-amplified sum signal have been obtained and stored in the first long-term peak detector 41. The second long-term peak detector 42 performs similar processing to the processing of the first long-peak detector 41 to determine all peak values of the logarithmically-amplified difference signal, so that such peak values are stored in the second long-term peak detector 42.

The peak values for the logarithmically-amplified sum signal and the logarithmically-amplified difference signal are supplied from the peak detection unit 40 to a target elevation angle/altitude calculation unit 50. The target elevation angle/altitude calculation unit 50 then sequentially subtracts each of the peak values of the logarithmically-amplified sum signal from each of the corresponding peak values of the logarithmically-amplified difference signal to generate plural difference values. The plural difference values are then averaged to obtain an average difference value. The average difference value is then converted in the target elevation angle/altitude calculation unit 50 to an average elevation angle or altitude value. Such average target elevation angle or altitude value may be supplied to the CRT 60 and displayed in correspondence with a selected target.

In the preferred embodiment, the target elevation angle/altitude calculation unit 50 includes subtraction-/averaging unit 51, anti-logarithm calculation unit 52 and calibration memory 53. The subtraction/averaging unit 51 may be realized with a microprocessor coupled to a memory. The subtraction/averaging unit 51 receives the peak values of the logarithmically-amplified sum signal and the peak values of the logarithmically-amplified difference signal. The subtraction/averaging unit 51 then sequentially subtracts the peak values of each of the logarithmically-amplified sum signals with each of the corresponding peak values of the logarithmically-amplified difference signals to generate difference values which are stored in the subtraction/averaging unit 51. The stored difference values are then averaged in the subtraction/averaging unit 51 to generate an average difference value. The average difference value is then converted from a logarithmic quantity into a numerical quantity in anti-logarithm calculation unit 52. The anti-logarithm calculation unit 52 is equivalent to the anti-logarithm function of conventional scientific calculators. The resulting numerical quantity is then provided to calibration memory 53 which generates an average target elevation angle or altitude value based on the numerical quantity. The average target elevation angle or altitude value is then supplied to CRT 60 for display in correspondence with a selected target.

A selector 70 receives the sum signal and the difference signal generated by the transmitter/receiver unit 10. For example, the selector 70 may be a comparator, or a microprocessor coupled to an analog-to-digital converter, performing the function of a comparator. The selector 70 compares the sum signal and the difference signal to determine whether the sum signal is greater than or equal to the difference signal. A selection signal indicative of this result is output to a search radar target tracking unit 80.

The search radar target tracking unit 80 performs tracking of a selected target. Such search radar target tracking units are well known. For example, the search radar target tracking unit 80 may include a MCAT (Micro-Computer Aided Tracking) unit, disclosed in Naval Research Laboratory Report 8709 dated Jul. 12, 1983, which is incorporated herein by reference. The search radar target tracking unit 80 may also compare the transmission time of the antenna beams generated by the transmitter/receiver unit 10 with echoes, or the sum and/or difference signals of such echoes, received by the transmitter/receiver unit 10 to determine target range or average target range for a selected target.

The search radar target tracking unit 80 is generally operable by an operator who may select a given target for tracking. When a target is selected, the search radar target tracking unit 80 maintains or stores target range, azimuth, elevation angle and/or altitude information and the like concerning the selected target, and periodically updates such information for the selected target. When a target has been selected for tracking, the search radar target tracking unit 80 receives the selection signal at a range, azimuth and/or elevation angle or altitude corresponding to the selected target and generates the gate signal to allow the logarithmically-amplified sum signal or the logarithmically-amplified difference signal to pass through the gate unit 30 to the peak detection unit 40.

Figure 6:
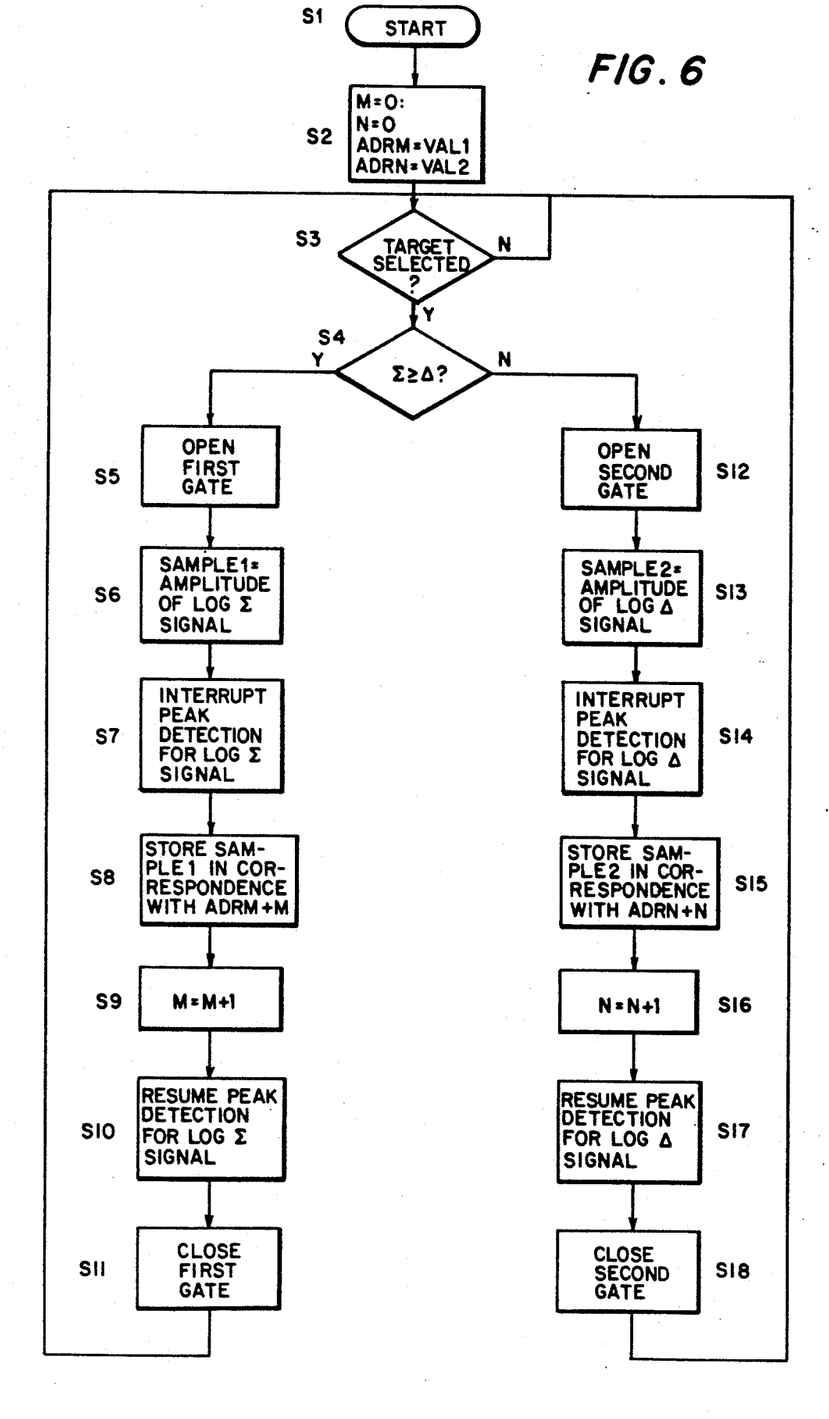
FIG. 6 is a flow chart of a method for sampling the sum and difference signals in a monopulse radar system, according to a preferred embodiment of the present invention.
Figure 7:
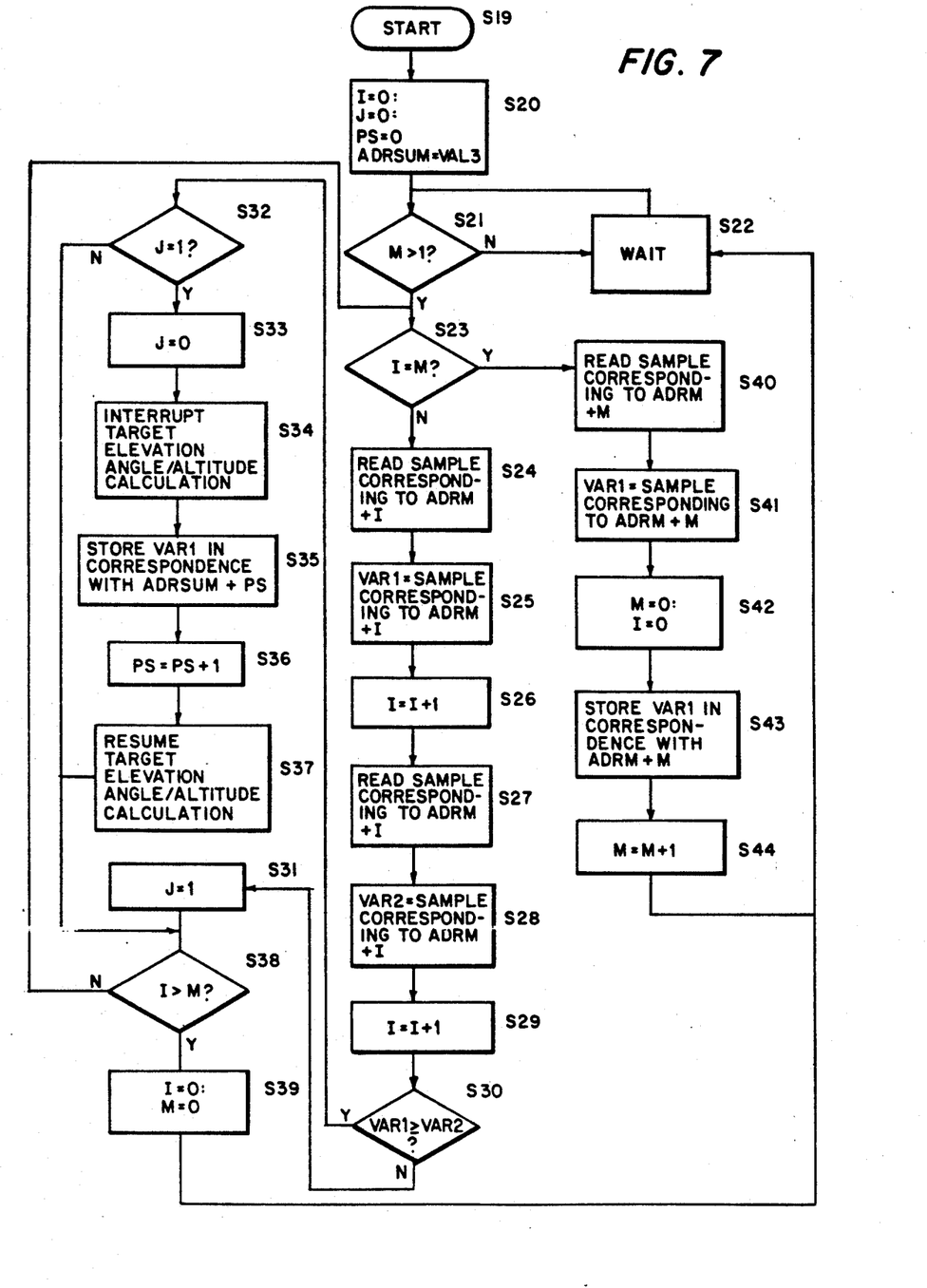
FIG. 7 is a flow chart of a method for determining peak values of the sum and difference signal according to a preferred embodiment of the present invention.
Figure 8:
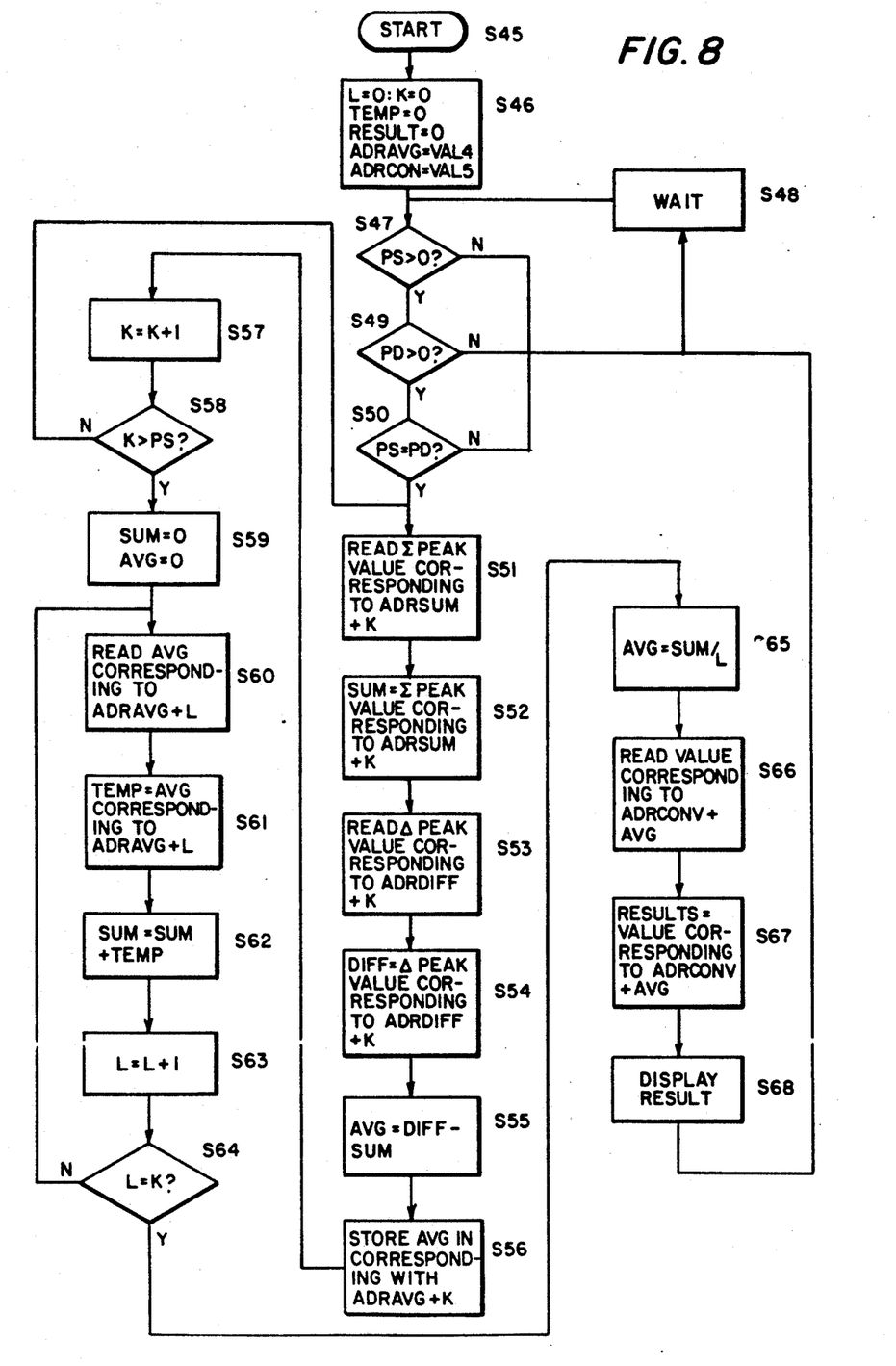
FIG. 8 is a flow chart of a method for obtaining normalized elevation angles and for averaging the normalized elevation angles to determine an average target elevation angle.

FIGS. 6–8 are flow charts for explaining a preferred embodiment of the present invention. Specifically, FIGS. 6 and 7 indicate processing steps performed by the transmitter/receiver unit 10, the logarithmic amplifier unit 20, the gate unit 30, the peak detection unit 40, the selector 70 and the search radar target tracking unit 80. Such processing steps relate to receiving a sum signal and a difference signal caused by an echo, and determining peak value(s) of the sum signal or logarithmically-amplified sum signal in the fading cycle of the sum signal. Processing steps to determine peak value(s) of the difference signal or logarithmically-amplified difference signal in the fading cycle of the difference signal are similar to processing steps for determining the peak value(s) of the sum signal or logarithmically-amplified sum signal. Accordingly, a description of processing steps relating to the difference signal or logarithmically-amplified difference signal are omitted, as such processing steps will be apparent from the description of the processing steps for determining the peak value(s) of the sum signal or logarithmically-amplified sum signal. FIG. 8 is a flow chart describing processing steps for determining at least one of average target elevation angle and altitude based on the peak value(s) corresponding to the sum signal or logarithmically-amplified sum signal and the peak value(s) corresponding to the difference signal or logarithmically-amplified difference signal.

Referring to FIG. 6, processing steps for determining peak value(s) of the sum signal or logarithmically-amplified sum signal in the fading cycle of the sum signal or logarithmically-amplified sum signal are commenced in step S1. In step S2, base address variables ADRM and ADRN are set to predetermined values VAL1 and VAL2, respectively. The base address variables ADRM and ADRN correspond to the first memory locations for storing sampled values corresponding to the sum signal or logarithmically-amplified sum signal, and the difference signal or logarithmically-amplified difference signal, respectively. Also, offset variables M and N are set to zero in step S2.

Processing proceeds to step S3 in which a decision is made to determine whether a target has been selected. Target selection is usually performed by an operator of the monopulse radar system, who determines whether a target should be selected for tracking. When no target at a given range interval and azimuth interval, for example, is selected, step S3 is repeated until a target is selected.

When a target is selected, processing proceeds to step S4 in which the amplitude of the sum signal is compared with the amplitude of the difference signal to determine whether the sum signal is greater than or equal to the difference signal. When the amplitude of the sum signal is greater than or equal to the amplitude of the difference signal, processing proceeds to step S5 in which the first gate 31 of FIG. 5 is opened. In step S6, the amplitude of the sum signal or logarithmically-amplified sum signal is sampled, and a variable SAMPLE1 is set to a sampled value corresponding to the sampled amplitude of the sum signal or logarithmically-amplified sum signal. In step S7, the peak detection processing of FIG. 7 is interrupted, and in step S8, variable SAMPLE1 is stored in correspondence with ADRM+M. In step S9, M is then incremented by 1, and peak detection for the sum signal or logarithmically-amplified sum signal is resumed in step S10. In step S11, the first gate is closed and processing returns to step S3.

On the other hand, in step S4, when the amplitude of the sum signal is not greater than or equal to the amplitude of the difference signal, processing proceeds to step S12 in which the second gate 32 is opened. A variable SAMPLE2 is set equal to the amplitude of the difference signal or logarithmically-amplified difference signal in step S13, and peak detection for the difference signal or logarithmically-amplified difference signal is interrupted in step S14. In step S15, a second value corresponding to the sampled amplitude of the difference signal or logarithmically-amplified difference signal is stored in correspondence with ADRN+N. In step S16, N is incremented by one, and in step S17, peak detection for the difference signal or logarithmically-amplified difference signal is resumed. Lastly, the second gate 32 is closed in step S18 and processing proceeds to step S3.

Step S4 expedites the determination of peak values because peak values of the sum signal or logarithmically-amplified sum signal occur substantially at minimum values of the difference signal or logarithmically-amplified difference signal, and vice versa. Therefore, the number of sampled values stored is reduced substantially by a factor of two by sampling in dependence upon whether the amplitude of the sum signal is greater than or equal to the amplitude of the difference signal, as tested in step S4.

FIG. 7 is a flow chart for determining peak values of the sum signal or logarithmically-amplified sum signal according to a preferred embodiment of the present invention. In step S19, processing for determining peak value(s) based on the sum signal or logarithmically-amplified sum signal in a fading cycle of the sum signal or logarithmically-amplified sum signal, is commenced. In step S20, offset variable I, flag J and offset variable PS are set to ZerO. Also, base address variable ADRSUM is set equal to a predetermined value VAL3.

In step S21, a determination is made to determine whether offset variable M is greater than 1. When the offset variable M is not greater than 1, processing proceeds to step S22 in which processing enters a wait state. On the other hand, when there are at least two sampled values corresponding to the sum signal or logarithmically-amplified sum signal, i.e., M is greater than 1 in step S21, processing proceeds to step S23 in which it is determined whether offset variable I is equal to offset variable M. Step S23 is used to determine whether all sampled values stored in step S8 of FIG. 6 have been compared. Accordingly, I will not be equal to M on the first loop performed in the peak value detection processing of FIG. 7.

When offset variable I is not equal to offset variable M, processing proceeds to step S24 in which a sampled value corresponding to a ADRM+I is read. In step S25, variable VARI is set equal to the sampled value corresponding to ADR+I. I is then incremented by one in step S26 and the sampled value corresponding to ADRM+I is read. A variable VAR2 is then set equal to the sampled value corresponding to ADR+I in step S28 and I is again incremented in step S29. In step S30, a determination is made to determine whether the variable VAR1 is greater than the variable VAR2. When the Variable VAR1 is not greater than the variable VAR2, flag J is set equal to one in step S31. The flag J is used to determine when successive sampled values are approaching a peak value. For example, referring to FIG. 3, the fading cycle function F(r) periodically cycles between peak values and minimum values of the sum signal or logarithmically-amplified sum signal. Accordingly, assuming a target is moving away from the transmitter unit of a radar system starting from $R=R_0$ to $R=R_{max}$, sampled values of the fading cycle function F(r) will increase to a peak at or near A and decrease to a value B at the minimum of the fading cycle. Accordingly, if sampling begins after A but before C, VAR1 would be greater than VAR2 although the values are decreasing to minimum value B and not increasing to the maximum value A. Accordingly, provision must be made to ensure that the fading cycle function F(r) is increasing to a peak value. By using the flag J, this result is accomplished.

Therefore, when the variable VAR1 is greater than the variable VAR2 in step S30, processing proceeds to step S32 to determine whether J is equal to one. When J is equal to one, a peak value has been detected. Accordingly, J is set equal to zero in step S33 and target elevation angle/altitude calculation processing is interrupted in step S34. VAR1 is then stored in correspondence with ADRSUM+PS in step S35 and PS is incremented by one in step S36. Target elevation angle/altitude calculation processing is then resumed in step S37 and control moves to step S38. On the other hand, when the flag J is not equal to one in step S32, control moves to step S38.

In step S38, a determination is made to establish whether the offset variable I is greater than the offset variable M. When the offset variable I is greater than the offset variable M, the last two sampled values have been compared. Accordingly, in step S39, the offset variable I and the offset variable M are set to zero and control proceeds to step S22 in which processing enters a wait state to allow for the accumulation of more sampled values.

On the other hand, when the offset variable I is not greater than the offset variable M, control proceeds to step S23 to determine whether I is equal to M. When I is not equal to M, it is known that more sampled values must be compared and control proceeds to step S24. On the other hand, when I is equal to M, the last stored sampled value must be moved from the last memory location to the first memory location. Accordingly, in step S40, the sampled value corresponding to ADRM+M is read and in step S41, VAL1 is set equal to the sampled value corresponding to ADRM+M. In step S42, offset variable M and offset variable I are set to zero. In step 43, VAL1 is stored in correspondence with ADRM+M, i.e. in the first memory location for the sampled values of the sum signal or logarithmically-amplified sum signal, and M is incremented in step S44. Control then enters a wait state in step S22.

When an interruption of peak detection processing is initiated in step S7 or step S14 of FIG. 6, the peak detection processing of FIG. 7 continues until control enters the wait state at step S22. Control then moves to the processing of FIG. 6 and peak detection processing is resumed in step S10 or step S17.

According to the above processing of FIG. 7, peak values for the sum signal or logarithmically-amplified sum signal are obtained and stored. Similar processing is employed to obtain peak values corresponding to the difference signal or the logarithmically-amplified difference signal. Accordingly, in the following description for obtaining average target elevation angle or altitude values, it is assumed that peak value(s) of the difference signal or logarithmically-amplified difference signal are stored at addresses ADRDIFF through ADRDIFF+PD.

FIG. 8 is a flow chart for determining average target elevation angle or altitude based on the peak values of the sum signal or the logarithmically-amplified sum signal, and the peak values of the difference signal or logarithmically-amplified difference signal. The processing steps of FIG. 8 are performed by the peak detection unit 40, the target elevation angle/altitude calculation unit 50 and the CRT 60.

In step S45, processing to determine average target elevation angle or altitude commences. In step S46, index L, offset variable K, variable TEMP, and variable RESULT are set to zero. Base address variables ADRAVG and ADRCON are set to predetermined values VAL4 and VAL5, respectively.

In step S47, a determination is made to establish whether variable PS is greater than zero. When offset variable PS is not greater than zero, control enters a wait state in step S48. On the other hand, when PS is greater than zero, it is determined whether offset variable PD is greater than zero in step S49. When offset variable PD is not greater than zero, control enters a wait state in step S48. On the other hand, when offset variable PD is greater than zero, a determination is made to establish whether offset variable PS is equal to offset variable PD in step S50 to establish whether each of the peak values corresponding to the sum signal or logarithmically-amplified sum signal have corresponding values of the difference signal or logarithmically-amplified difference signal. When offset variable PS is not equal to offset variable PD, control enters a wait state in step S48. On the other hand, when offset variable PS is equal to offset variable PD, the peak value of the sum signal or logarithmically-amplified sum signal corresponding to ADRSUM+K is read in step S51. In step S52, variable SUM is set equal to the peak value of the sum signal or logarithmically-amplified sum signal corresponding to ADRSUM+K. In step S53, the peak value corresponding to the difference signal or logarithmically-amplified difference signal is read, and in step S54, variable DIFF is set equal to the peak value of the difference signal or logarithmically-amplified difference signal corresponding to ADRDIFF+K. In step S55, variable AVG is set equal to DIFF−SUM and in step S56, variable AVG is stored in correspondence with ADRAVG+K.

In step S57, offset variable K is incremented by one and in step S58, a determination is made to establish whether offset variable K is greater than offset variable PS. When offset variable K is not greater than offset variable PS, steps S51 through S56 are repeated. On the other hand, when offset variable K is greater than offset variable PS, control proceeds to step S59 in which variable SUM and variable AVG are set to zero. In step S60, variable AVG corresponding to ADRAVG+L is read and variable TEMP is set equal to the value of AVG corresponding to ADRAVG+L in step S61. In step S62, the variable SUM is set equal to SUM+TEMP. In step S63, L is incremented by one.

In step S64, a determination is made to establish whether the variable L is equal to offset variable K. When offset variable L is not equal to offset variable K, steps S60-S63 are repeated. On the other hand, when offset variable L is equal to offset variable K, an average value is obtained by setting the variable AVG equal to the variable SUM divided by offset value L. In step S66, an average target elevation angle or altitude value corresponding to ADRCONV+AVG is read from a memory location. Memory locations having a base address of ADRCONV essentially comprise a look-up table in which values corresponding to the variable AVG are converted into average target elevation angle or altitude values.

In step S67, the variable RESULT is set equal to the average target elevation angle or altitude value corresponding to ADRCONV AVG. In step S68, the result is displayed, preferably in correspondence with the target selected.

Control then enters a wait state in step S48 to await the accumulation of further peak values of the sum signal or logarithmically-amplified sum signal, and the difference signal or the logarithmically-amplified difference signal.

When processing for determining target elevation angle or altitude of FIG. 8 is interrupted in step S34, processing continues in FIG. 8 until control enters the wait state of step S48. Control then moves to the processing of FIG. 7 until target elevation angle or altitude processing is resumed in step S37 of FIG. 7.

While the processing of FIG. 8 involves the calculation of an average target elevation angle or altitude value, an alternative method may be employed in which peak values of the sum signal or logarithmically-amplified sum signal and peak values of the difference signal or logarithmically-amplified difference signal are used to directly calculate and display target elevation angle or altitude values in correspondence with a selected target without averaging.

In addition, peak detection of the sum signal or logarithmically-amplified sum signal, and the difference signal or logarithmically-amplified difference signal may be performed using well known frequency agility techniques.

Figure 9:
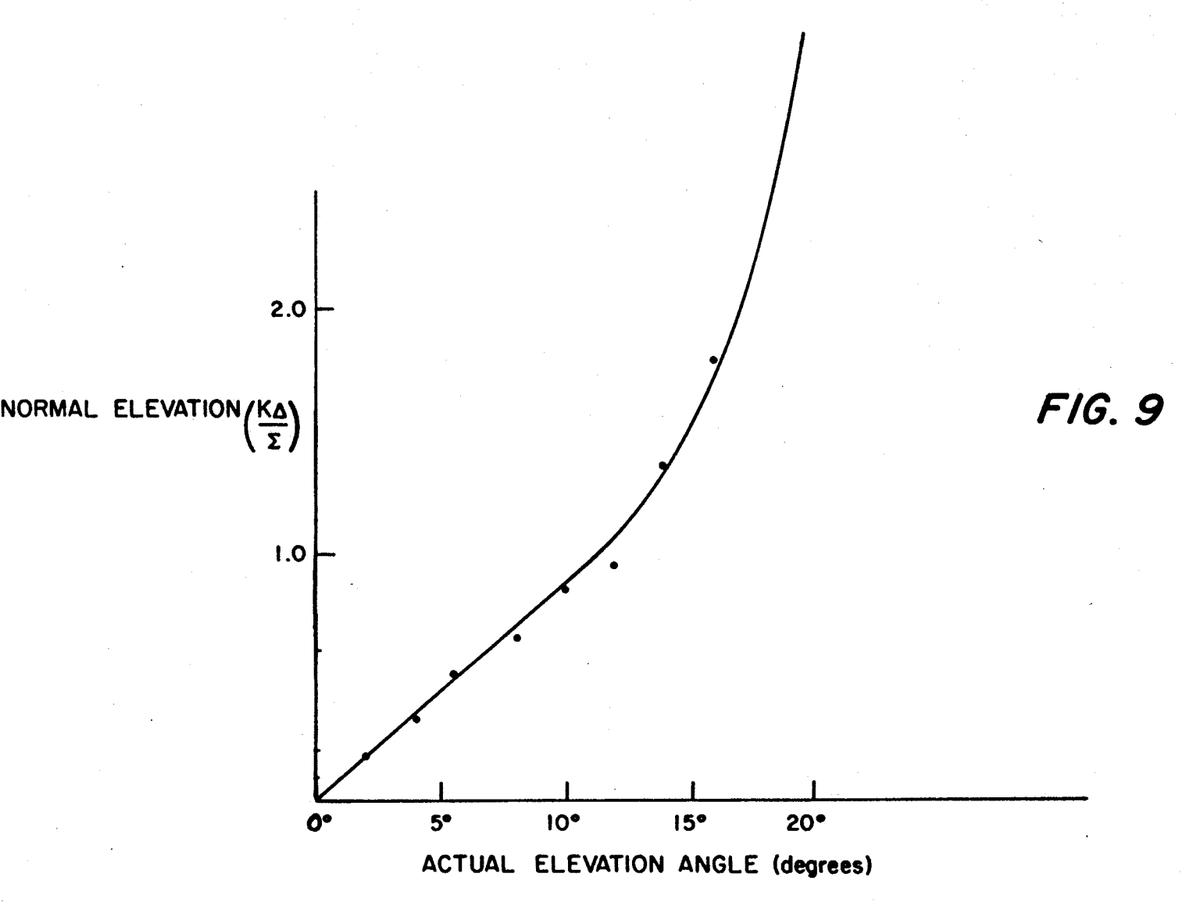
FIG. 9 is a graph of normalized elevation angle versus actual elevation angle.

FIG. 9 is a graph of normalized elevation angle versus actual elevation angles. In the case in which samples are obtained from the logarithmically-amplified sum signal and logarithmically-amplified difference signal, an anti-logarithm must be performed on the value $\log K\Delta - \log \Sigma$ to obtain normalized elevation angle $K\Delta/\Sigma$. Based on the graph of FIG. 9, the normalized elevation angle $K\Delta/\Sigma$ may be converted into actual elevation angle in degrees according to FIG. 9.

The calibration memory 53 contains memory locations having addresses corresponding to the normalized elevation $K\Delta/\Sigma$, and data stored at the locations corresponding to actual elevation angle. Thus, a value corresponding to the actual target elevation angle or altitude, or average target elevation angle or altitude may be read out and displayed on the CRT 60.

While the above description of the logarithmic amplifier unit 20, the gate unit 30, the peak detection unit 40, the target elevation angle/altitude calculation unit 50, the selector 70, and the search radar target tracking unit 80 were described as discrete components, any one or more of these elements may be realized with a computer. Further, any one or more of the processing steps of FIGS. 6–8 may be realized with a microcomputer or computer.

The many features and advantages of the present invention are apparent from the detailed specification and thus, and it is intended by the appended claims to cover such features and advantages of the systems and methods which follow in the true spirit and scope of the invention. Further, since numerous modification and changes will readily occur to those skilled in the art, it is not desired to limit the invention to the exact construction and operation illustrated and described. Accordingly, all suitable modifications and equivalents may be resorted to as falling within the scope and spirit of the invention.

What is claimed is:

1. A method for determining at least one of target elevation angle and altitude in a monopulse radar system based on first and second antenna beams, the first and second antenna beams defining an axis location which is aligned substantially on a horizon, comprising the steps of:
   a) receiving a sum signal and a difference signal caused by an echo from the first and second antenna beams;
   b) determining a first peak value based on the sum signal in a first fading cycle of the sum signal;
   c) determining a second peak value based on the difference signal in a second fading cycle of the difference signal; and
   d) determining at least one of the target elevation angle and altitude based on the first peak value and the second peak value.

2. A method as claimed in claim 1, further comprising the step of:
   e) displaying at least one of target elevation angle and altitude.

3. A method as claimed in claim 1, further comprising the step of:
   e) performing said steps (b)-(d) only when a target corresponding to the echo is selected by an operator.

4. A method as claimed in claim 3, further comprising the step of:
   e) displaying at least one of the target elevation angle and altitude in correspondence with a target selected by an operator.

5. A method as claimed in claim 1, further comprising the steps of:
   e) repeatedly executing said steps (b)-(d); and
   f) averaging the at least one of target elevation angle and altitude determined in said step (d) to provide at least one of an average target elevation angle and altitude.

6. A method as claimed in claim 5, further comprising the steps of:
   g) performing said steps (b)-(f) only when a target corresponding to the echo is selected by an operator; and
   h) displaying at least one of the average target elevation angle and altitude in correspondence with the target selected by the operator.

7. A method as claimed in claim 1, wherein said step (b) comprises the substeps of:
   (b1) logarithmically amplifying the sum signal to provide a logarithmically-amplified sum signal;
   (b2) sampling the logarithmically-amplified sum signal to provide sum sampled values; and
   (b3) comparing the sum sampled values to determine the first peak value,
   wherein said step (c) comprises the substeps of:
   (c1) logarithmically amplifying the difference signal to provide a logarithmically-amplified difference signal; and
   (c2) sampling the logarithmically-amplified difference signal to provide difference sampled values to determine the second peak value, and
   wherein said step (d) comprises the substeps of:
   (d1) subtracting the first peak value from the second peak value to provide a result; and
   (d2) converting the result into at least one of the target elevation angle and altitude using a look-up table.

8. A method as claimed in claim 1, wherein said steps (b) and (c) are performed using frequency agility.

9. A system for determining at least one of target elevation angle and altitude of a target in a monopulse radar system based on an echo from the target caused by first and second antenna beams, the first and second antenna beams defining an axis location which is aligned substantially on a horizon, comprising:
   a transmitter/receiver unit for generating the first and second antenna beams, and for receiving a sum signal and a difference signal caused by the echo from the first and second antenna beams;
   a peak detection unit, coupled to said transmitter/receiver unit, for determining a first peak value based on the sum signal in a first fading cycle of the sum signal, the first fading cycle being caused by movement of the target relative to said transmitter receiver unit, and for determining a second peak value based on the difference signal in a second fading cycle of the difference signal, the second fading cycle being caused by the movement of the target relative to said transmitter/receiver unit; and
   a target elevation angle/altitude calculation unit, coupled to said peak detection unit, for determining at least one of target elevation angle and altitude based on the first peak value and the second peak value.

10. A system as claimed in claim 9, further comprising:
    a display, coupled to said target elevation angle/altitude calculation unit, for displaying at least one of target elevation angle and altitude.

11. A system as claimed in claim 9,
    wherein said peak detector unit repeatedly determines first peak values and second peak values, and
    wherein said target elevation angle/altitude calculation unit determines at least one of average target elevation angle and altitude based on the first peak values and second peak values.

12. A system as claimed in claim 11, further comprising:
    a display coupled to said target elevation angle/altitude calculation unit, for displaying at least one of average target elevation angle and altitude.

13. A system as claimed in claim 12, further comprising:
    a search radar target tracking unit, coupled to said transmitter/receiver unit and said peak detection unit, for determining when a target corresponding to the echo is selected for tracking, and
    wherein said display displays at least one of average target elevation angle and altitude in correspondence with the target.

14. A system as claimed in claim 13,
    wherein said search radar target tracking unit generates an average target range signal corresponding to the target, and
    wherein said display displays average target range in correspondence with the target, based on the target range signal.

15. A system as claimed in claim 13,
    wherein said target elevation angle/altitude calculation unit generates an average target range signal corresponding to the target, based on the first peak values, and
    wherein said display displays the average target range in correspondence with the target, based on the average target range signal.

16. A system as claimed in claim 13, further comprising:
    a selector, coupled between said transmitter/receiver unit and said search radar target tracking unit, for generating a selection signal based on which one of the sum signal and the difference signal has a largest amplitude, and for providing the selection signal to said search radar target tracking unit;
    a logarithmic amplifier unit, coupled between said transmitter/receiver unit and said peak detection unit, for logarithmically amplifying the sum signal and the difference signal; and
    a gate unit, coupled to said logarithmic amplifier unit, said search radar target tracking unit and said peak detection unit, for selectively providing the logarithmically-amplified sum signal and the logarithmically-amplified difference signal to said peak detection unit based on a gate signal generated by said search radar target tracking unit in response to the selection signal and whether the target corresponding to the echo is selected for tracking.

17. A system for determining at least one of target elevation angle and altitude of a target in a monopulse radar system based on an echo from the target caused by first and second antenna beams, the first and second antenna beams defining an axis location, comprising:
    means for receiving a sum signal and a difference signal caused by the echo from the first and second antenna beams; and
    means for determining a first peak value based on the sum signal in a first fading cycle of the sum signal, the first fading cycle being caused by movement of the target relative to said means for receiving, for determining a second peak value based on the difference signal in a second fading cycle of the difference signal, the second fading cycle being caused by the movement of the target relative to said means for receiving, and for determining at least one of the target elevation angle and altitude based on the first peak value and the second peak value.

18. A system as claimed in claim 17, further comprising:
means for displaying at least one of target elevation angle and altitude.

19. A system as claimed in claim 17,
wherein said means for determining the first peak value repeatedly determines first peak values over a predetermined number of scans of said monopulse radar system,
wherein said means for determining the second peak value repeatedly determines second peak values over the predetermined number of scans of said monopulse radar system, and said system further comprising means for averaging at least one of target elevation angle and altitude to provide at least one of an average target elevation angle and altitude.

20. A system as claimed in claim 19, further comprising:
means for displaying the average target elevation angle and altitude.

21. A method for determining at least one of target elevation angle and altitude in a monopulse radar system, based on first and second antenna beams, comprising the steps of:
 a) receiving a sum signal and a difference signal caused by an echo from the first and second antenna beams;
 b) determining peak values of the sum and difference signals;
 c) determining at least one of the target elevation angle and altitude, based on the peak values.

22. The method of claim 21, wherein said step comprises determining the ratio of the absolute value of said peak value of said difference signal to the absolute value of said peak value of said sum signal.

23. The system of claim 17, wherein said means for determing further comprises means for calculating the ratio of the absolute value of said second peak value to the absolute value of said first peak value.

* * * * *